(12) United States Patent
Li et al.

(10) Patent No.: US 10,140,943 B2
(45) Date of Patent: Nov. 27, 2018

(54) THIN FILM TRANSISTOR DRIVE CIRCUIT AND DRIVE METHOD THEREOF AND LIQUID CRYSTAL DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Yuan Li, Xiamen (CN); Zifeng Chen, Xiamen (CN)

(73) Assignees: XIAMEN TIANMA MICRO-ELECTRONICS CO., LTD., Xiamen (CN); TIANMA MICRO-ELECTRONICS C., LTD., Shenzhen (CN)

( * ) Notice: Subject to any disclaimer, the term of this patent is extended or adjusted under 35 U.S.C. 154(b) by 52 days.

(21) Appl. No.: 15/464,242

(22) Filed: Mar. 20, 2017

(65) Prior Publication Data

US 2017/0193951 A1    Jul. 6, 2017

Related U.S. Application Data

(63) Continuation of application No. 14/308,643, filed on Jun. 18, 2014, now Pat. No. 9,620,071.

(30) Foreign Application Priority Data

Dec. 30, 2013    (CN) .......................... 2013 1 0754136

(51) Int. Cl.
    *G09G 3/36*     (2006.01)
    *G02F 1/1368*   (2006.01)
    *G02F 1/1362*   (2006.01)

(52) U.S. Cl.
    CPC ......... *G09G 3/3674* (2013.01); *G02F 1/1368* (2013.01); *G02F 1/136286* (2013.01);
    (Continued)

(58) Field of Classification Search
    CPC ... G09G 2300/0426; G09G 2310/0281; G09G 2320/0223; G09G 3/3674; G09G 3/3677; G02F 1/136286; G02F 1/1368
    See application file for complete search history.

(56) References Cited

U.S. PATENT DOCUMENTS 8,441,424 B2     5/2013   Lee
8,707,115 B2 *   4/2014   Jung .................... G06F 11/267
                                                      714/726

(Continued)

FOREIGN PATENT DOCUMENTS

CN    101226713 A    7/2008
CN    102968970 A    3/2013

*Primary Examiner* — Patrick N Edouard
*Assistant Examiner* — Douglas M Wilson
(74) *Attorney, Agent, or Firm* — Alston & Bird LLP

(57) ABSTRACT

The invention discloses a thin film transistor drive circuit and a drive method thereof and a liquid crystal display device. The thin film transistor drive circuit includes a plurality of scan lines, a scan signal output port configured to sequentially apply a scan signal to each of the scan lines, and a plurality of logic circuits. Each of the logic circuits is connected with one of the scan lines and a control signal line. The logic circuits are added to a drive circuit, and an input control signal corresponding to a truth table of the logic circuit is input for a preset duration by using a logic relationship of the logic circuit, so that an output control signal output to a scan line can be obtained to improve a scan signal on the scan line, to improve a delay distortion at the time of being turned off.

12 Claims, 8 Drawing Sheets

(52) U.S. Cl.
 CPC ... *G09G 3/3677* (2013.01); *G09G 2300/0426* (2013.01); *G09G 2310/0224* (2013.01); *G09G 2310/0281* (2013.01); *G09G 2320/0209* (2013.01); *G09G 2320/0223* (2013.01); *G09G 2320/0247* (2013.01)

(56) References Cited

U.S. PATENT DOCUMENTS

| | | | |
|---|---|---|---|
| 2009/0237136 A1* | 9/2009 | Kim | G01R 31/31854 327/210 |
| 2011/0018846 A1* | 1/2011 | Hu | G02F 1/136286 345/204 |

* cited by examiner

|   | Scan signal | Input control signal | Output control signal |
|---|---|---|---|
| 1 | 0 | 0 | 0 |
| 2 | 0 | 1 | 0 |
| 3 | 1 | 0 | 0 |
| 4 | 1 | 1 | 1 |

Fig. 5A

|   | Scan signal | Input control signal | Output control signal |
|---|---|---|---|
| 1 | 0 | 0 | 0 |
| 2 | 0 | 1 | 0 |
| 3 | 1 | 0 | 1 |
| 4 | 1 | 1 | 0 |

Fig. 5B

THIN FILM TRANSISTOR DRIVE CIRCUIT AND DRIVE METHOD THEREOF AND LIQUID CRYSTAL DISPLAY DEVICE

CROSS-REFERENCES TO RELATED APPLICATIONS

This application is a continuation application of the U.S. application Ser. No. 14/308,643, filed on Jun. 18, 2014, which claims priority to Chinese patent application No. 201310754136.7 filed on Dec. 30, 2013, the content of which is incorporated herein by reference in its entirety.

FIELD OF THE INVENTION

The present invention relates to the field of display technologies, and more particularly to a thin film transistor drive circuit and a drive method thereof and a liquid crystal display device.

BACKGROUND OF THE INVENTION

In a Thin Film Transistor (TFT) liquid crystal display device in the prior art, pixels are controlled separately and precisely by active switches, so a finer display effect can be achieved as compared with previous passive driving techniques.

Scan lines of a display panel have some impedance. The impedance of a scan line in a TFT drive circuit may be represented by a multitude of series RC circuits, as illustrated in FIG. 1.

Ideally, when a scan signal is loaded to a scan line from an input end of the scan line, there is a waveform diagram of the scan signal as illustrated in FIG. 2A, where a TFT is turned on at a time $t_1$ and turned off at a time $t_2$. In practice, the series RC circuit equivalent to the scan line in FIG. 1 may cause a delay distortion of the scan signal during transmission of the scan signal, thus resulting in a waveform diagram of the distorted scan signal as illustrated in FIG. 2B, where the TFT is turned on at the time $t_1$ and turned off at a time $t_2'$ with $t_2'>t_2$, and as can be apparent, there is a delay distortion occurring at the time when the TFT is turned off. Moreover, the extent of the delay distortion of the scan signal is so variable during transmission of the scan signal that the closer the location is to an end of the scan line, the higher the equivalent impedance of the series RC will be, and the more serious the delay distortion of the scan signal will be.

In the existing liquid crystal display device, the delay distortion of the scan signal may degrade the display quality and result in area flickering, crosstalk and other problems.

At present, there are the following three common scan line design schemes:

1. Unilateral driving as illustrated in FIG. 3A, where this scheme is simple to design but may suffer from the delay distortion described above and other problems.
2. Bilateral driving as illustrated in FIG. 3B, where this scheme can improve the delay distortion but may be complex to design a circuit and strictly require synchronization of a clock signal and also suffer from increased power consumption, lowered reliability and other problems.
3. Interlaced driving as illustrated in FIG. 3C, where this scheme can visually improve the problems (e.g., flickering, crosstalk, etc.) arising from the delay distortion but fails to substantially improve the delay distortion; and additional clock signals for interlaced driving may result in an increased load on a drive integrated circuit.

BRIEF SUMMARY OF THE INVENTION

In view of this, embodiments of the invention provide a Thin Film Transistor (TFT) drive circuit and a drive method thereof and a display device, so as to address the problems in the prior art of a distorted signal degraded due to a delay of a disabling signal on a scan line.

The embodiments of the invention adopt the following technical solutions: an embodiment of the invention provides a thin film transistor drive circuit including: a plurality of scan lines; a scan signal output port configured to sequentially apply a scan signal to each of the plurality of scan lines; and a plurality of logic circuits, wherein each of the plurality of logic circuits is connected with one of the plurality of scan lines and a control signal line, for receiving an input control signal from the control signal line and applying an output control signal to the plurality of scan lines; wherein, when an enabling signal is loaded on one of the plurality of scan lines for a first preset duration, inverting the output control signal for a second preset duration, so that a voltage level of the scan signal loaded on the plurality of scan lines is a voltage level of a disabling signal; and wherein a voltage level of the enabling signal on the plurality of scan lines is dropped to a lower level after the second preset duration begins.

An embodiment of the invention further provides a drive method using the drive circuit, the method including: sequentially applying a scan signal to each of the plurality of scan lines; and applying an input control signal to a logic circuit; and applying an output control signal by the logic circuit to the plurality of scan line; wherein, when an enabling signal is loaded on the scan line for a first preset duration, inverting the output control signal for a second preset duration, so that a voltage level of the scan signal loaded on the plurality of scan lines is the voltage level of a disabling signal; wherein the high voltage level of the enabling signal on the plurality of scan line is dropped to a lower voltage level after the second preset duration begins.

An embodiment of the invention further provides a liquid crystal display device including the drive circuit described above.

Advantageous effects of the invention are as follows:

In the embodiments of the invention, a logic circuit is added to a drive circuit, and an input control signal corresponding to a truth table of the logic circuit is input for a preset duration by using a logic relationship of the logic circuit, so that an output control signal output to a scan line can be obtained to improve a scan signal on the scan line, to improve a delay distortion at the time of being turned off.

BRIEF DESCRIPTION OF THE DRAWINGS

In order to make the technical solutions in the embodiments of the invention more apparent, the drawings to be used in a description of the embodiments will be briefly introduced below, and apparently the drawings to be described below are merely illustrative of some embodiments of the invention, and those ordinarily skilled in the art can derive other drawings from these drawings without any inventive effort. In the drawings:

FIG. 5A is a truth table corresponding to a first type of logic circuit;

FIG. 5B is a truth table corresponding to a second type of logic circuit;

DETAILED DESCRIPTION OF THE INVENTION

In order to make the objects, the technical solutions and the advantages of the invention more apparent, the invention will be further described in detail with reference to the drawings. Apparently, the described embodiments are only a part but not all of the embodiments of the invention. Based on the embodiments of the invention here, all of other embodiments derived by those ordinarily skilled in the art without any inventive effort shall come into the scope of the invention.

In embodiments of the invention, a logic circuit is added to a drive circuit, and an input control signal corresponding to a truth table of the logic circuit is input for a preset duration by using a logic relationship of the logic circuit, so that an output control signal output to a scan line can be obtained to improve a scan signal on the scan line, to improve a delay distortion at the time of being turned off.

Figure 1:
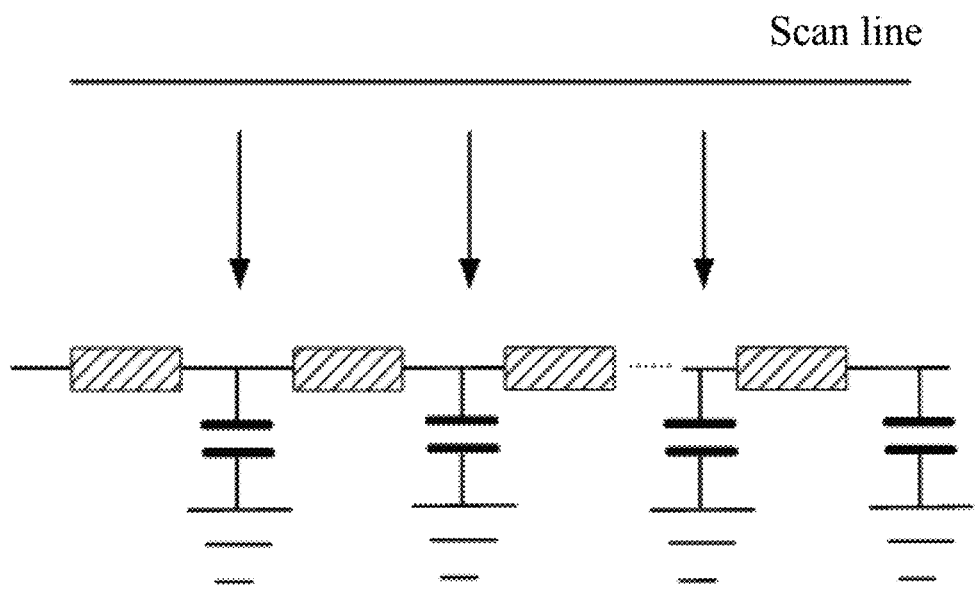
FIG. 1 is a schematic diagram of a scan line and an equivalent RC series circuit in the prior art.
Figure 2A:
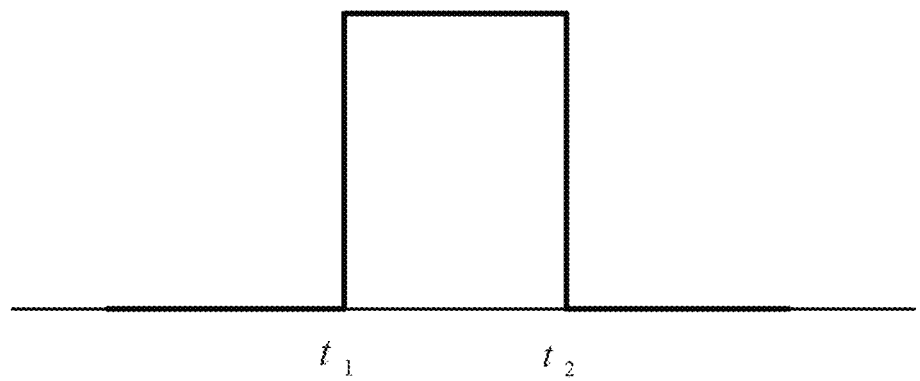
FIG. 2A is a schematic diagram of a waveform of an ideal scan signal.
Figure 2B:
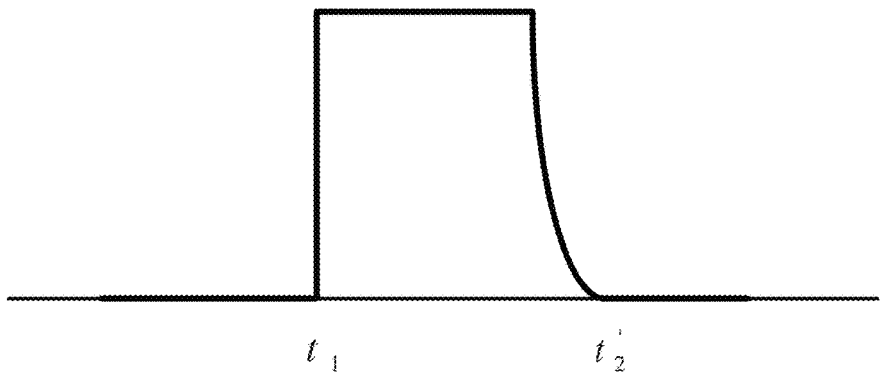
FIG. 2B is a schematic diagram of a waveform of a real scan signal.
Figure 3A:
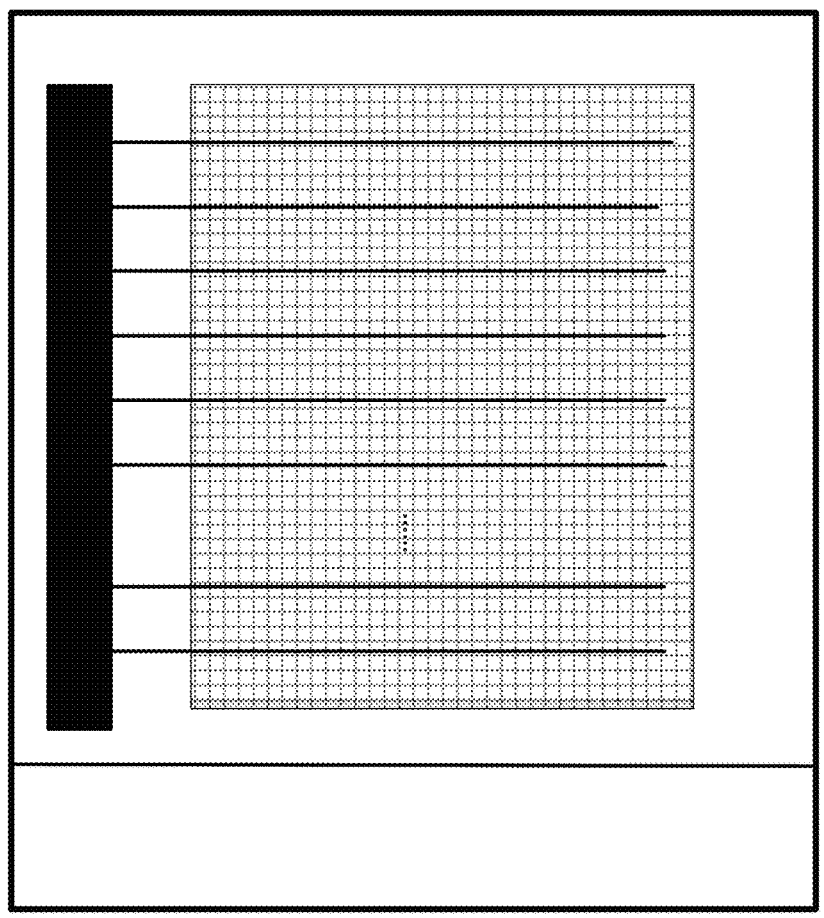
FIG. 3A is a schematic diagram of a unilateral driving structure in the prior art.
Figure 3B:
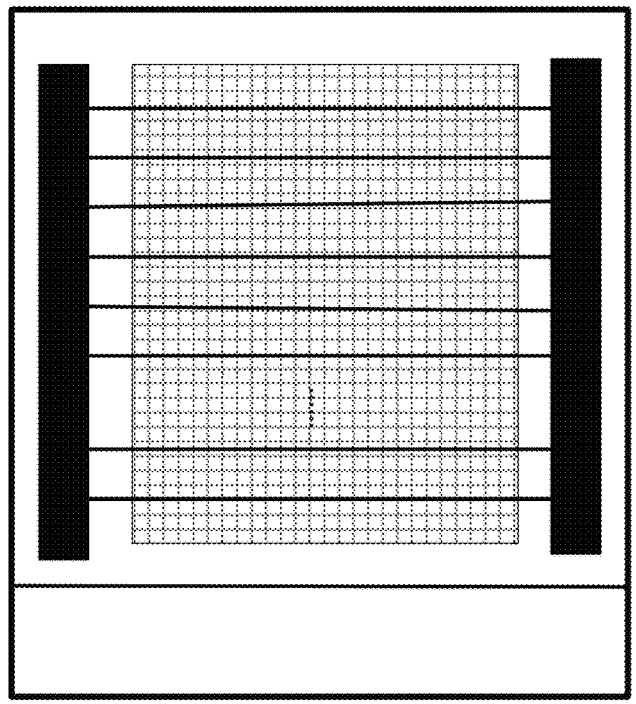
FIG. 3B is a schematic diagram of a bilateral driving structure in the prior art.
Figure 3C:
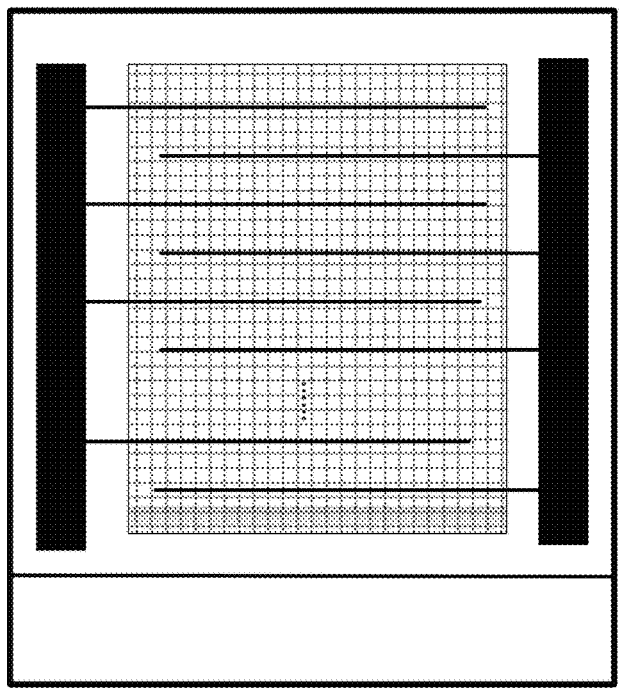
FIG. 3C is a schematic diagram of an interlaced driving structure in the prior art.
Figure 4:
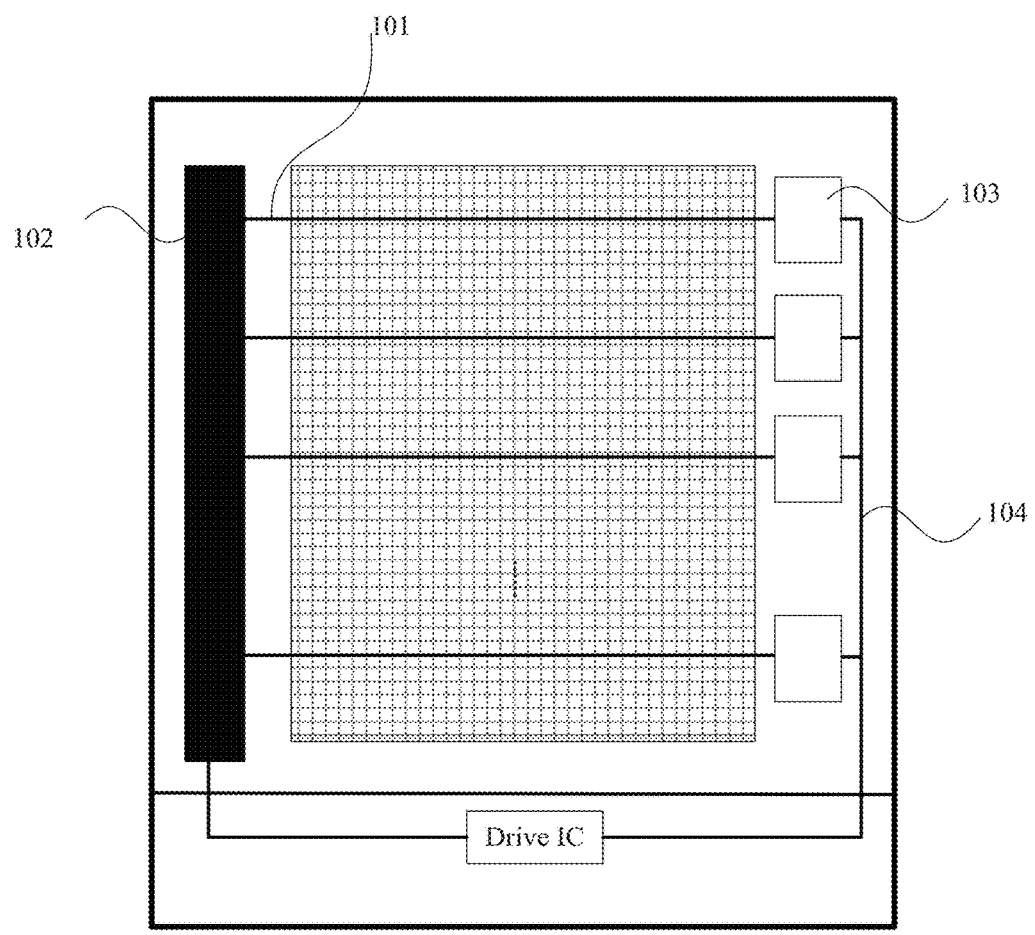
FIG. 4 is a schematic structural diagram of a thin film transistor drive circuit according to a first embodiment of the invention.

FIG. 4 illustrates a schematic structural diagram of a thin film transistor drive circuit according to a first embodiment of the invention. The drive circuit includes:

A plurality of scan lines 101;

A scan signal output port 102 configured to sequentially apply a scan signal to each scan line; and A plurality of logic circuits 103, each of which has one end connected with an end of one of the scan lines 101 and the other end connected with a control signal line 104.

In the diagram of the drive circuit illustrated in FIG. 4, a drive integrated circuit (a drive IC as illustrated) provides the scan signal output port 102 connected therewith with a control signal, so that the scan signal output port 102 outputs the scan signal. Moreover, the drive integrated circuit also provides the respective logic circuits 103 connected therewith with input control signals, where all of the control signals and the scan signals are periodical signals, and periods of time for which high and low levels are loaded can be controlled by setting the drive IC for the purpose of control and adjustment as desired in practice.

Each of the logic circuits 103 in FIG. 4 may include a plurality of thin film transistors. In some embodiments, the logic circuit 103 may be divided into two types of structures, as illustrated in FIG. 5A and FIG. 5B, which are a truth table corresponding to a first type of logic circuit and a truth table corresponding to a second type of logic circuit, respectively. The truth table is used to represent relationships among inputs and outputs. In these two truth tables, a logic analysis is made by taking a high level is an enabling voltage (denoted as logic 1) and a low level is a disabling voltage (denoted as logic 0) as an example. However, the invention will not be limited to any specific level status of an enabling voltage, and since a thin film transistor can be triggered to be turned on by either a high level or a low level, a logic analysis can alternatively be made by taking a low level is an enabling voltage (denoted as logic 1) and a high level is a disabling voltage (denoted as logic 0) as an example, and a repeated description thereof will be omitted in the invention so long as the illustrated truth tables can be clarified.

In the truth table of FIG. 5A, the numerals 1, 2, 3, and 4 in the leftmost column denote the four logic relationships among the inputs (scan signal, input control signal) and the output (output control signal) of a logic circuit. When a scan signal on a scan line is at a low level, the logic circuit outputs an output control signal at a low level regardless of whether an input control signal input to the logic circuit is at a high level or a low level, so there is no influence on the scan signal at a low level on the scan line. When a scan signal on a scan line is at a high level, if an input control signal input to the logic circuit is at a low level, then the logic circuit outputs an output control signal at a low level to the scan line, so that the scan signal is changed to a low level; and if an input control signal input to the logic circuit is at a high level, then the logic circuit outputs an output control signal at a high level without any influence on the scan signal at a high level on the scan line.

In the truth table in FIG. 5B, when a scan signal on a scan line is at a low level, the logic circuit outputs an output control signal at a low level regardless of whether an input control signal input to the logic circuit is at a high level or a low level, so there is no influence on the scan signal at a low level on the scan line. When a scan signal on a scan line is at a high level, if an input control signal input to the logic circuit is at a low level, then the logic circuit outputs an output control signal at a high level without any influence on the scan signal at a high level on the scan line; and if an input control signal input to the logic circuit is at a high level, then the logic circuit outputs an output control signal at a low level to the scan line, so that the scan signal is changed to a low level.

Thus, for the logic circuits 103, only the two logic analysis results described above may apply regardless of an internal structure thereof, and in correspondence to the two truth tables above, there may be numerous structures respectively for a first type of logic circuit and a second type of logic circuit, and the types and amount of thin film transistors in the respective logic circuits will not be limited to any particular type and amount but may be selected and set as desired.

Figure 6A:
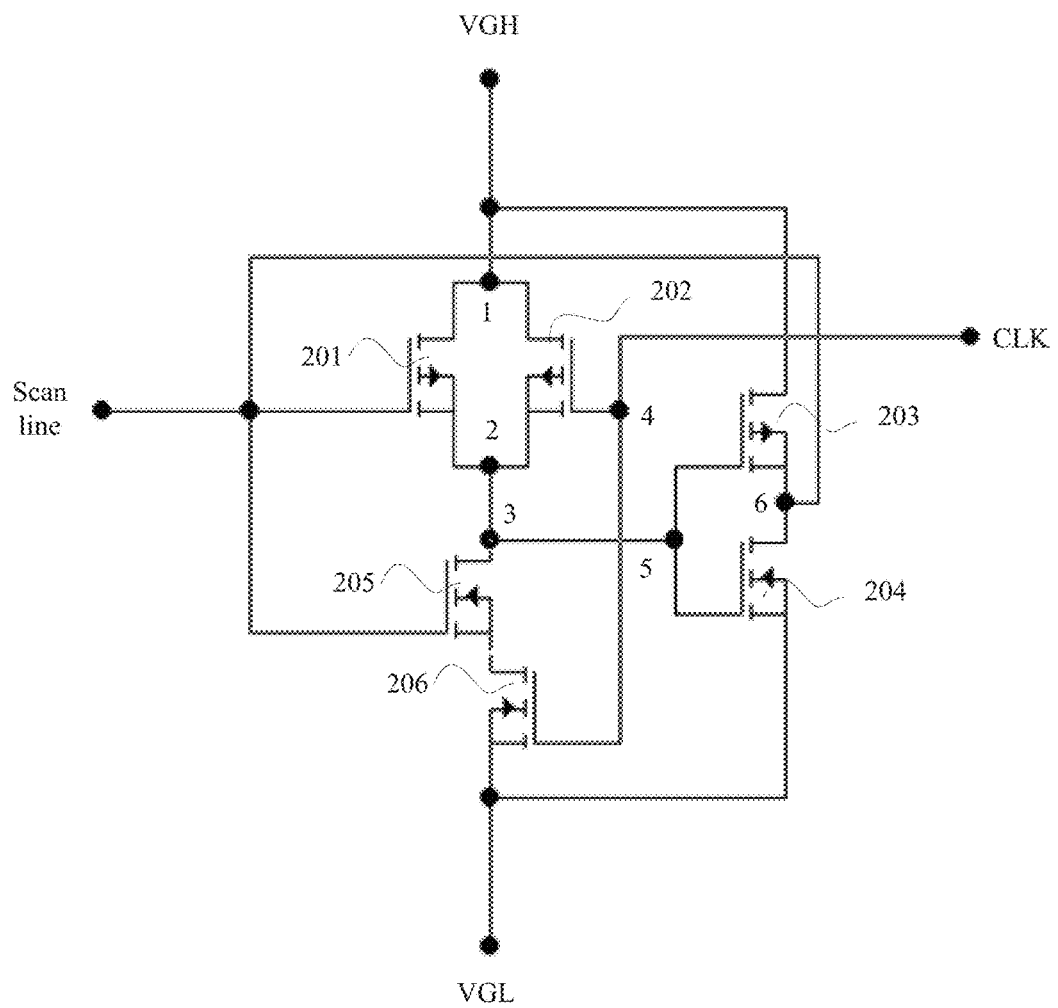
FIG. 6A is a schematic structural diagram of a first type of logic circuit according to the first embodiment of the invention.

Optionally, as illustrated in FIG. 6A, there is illustrated a structural diagram of a logic circuit according to a first embodiment of the invention, where the logic circuit is the first type of logic circuit including three P-type thin film transistors and three N-type thin film transistors, where the respective thin film transistors are connected directly or indirectly through nodes, particularly as follows:

A first P-type thin film transistor 201 having a gate connected with the scan line, a source connected with a first node, and a drain connected with a second node, where the first node is connected with a high-level signal line and the second node is connected with a third node;

A second P-type thin film transistor 202 having a gate connected with the control signal line through a fourth node, a source connected with the first node, and a drain connected with the second node;

A third P-type thin film transistor 203 having a gate connected with a fifth node, a source connected with the high-level signal line, and a drain connected with a sixth node, where the sixth node is connected with the scan line;

A first N-type thin film transistor 204 having a gate connected with the fifth node, a drain connected with the sixth node, and a source connected with a low-level signal line;

A second N-type thin film transistor 205 having a gate connected with the scan line, a drain connected with the third node, and a source connected with a drain of a third N-type thin film transistor; and The third N-type thin film transistor 206 having a gate connected with the control signal line through the fourth node, the drain connected with the source of the second N-type thin film transistor, and a source connected with the low-level signal line.

The first node to the sixth node may be denoted respectively as a node 1 to a node 6 in FIG. 6A.

Figure 6B:
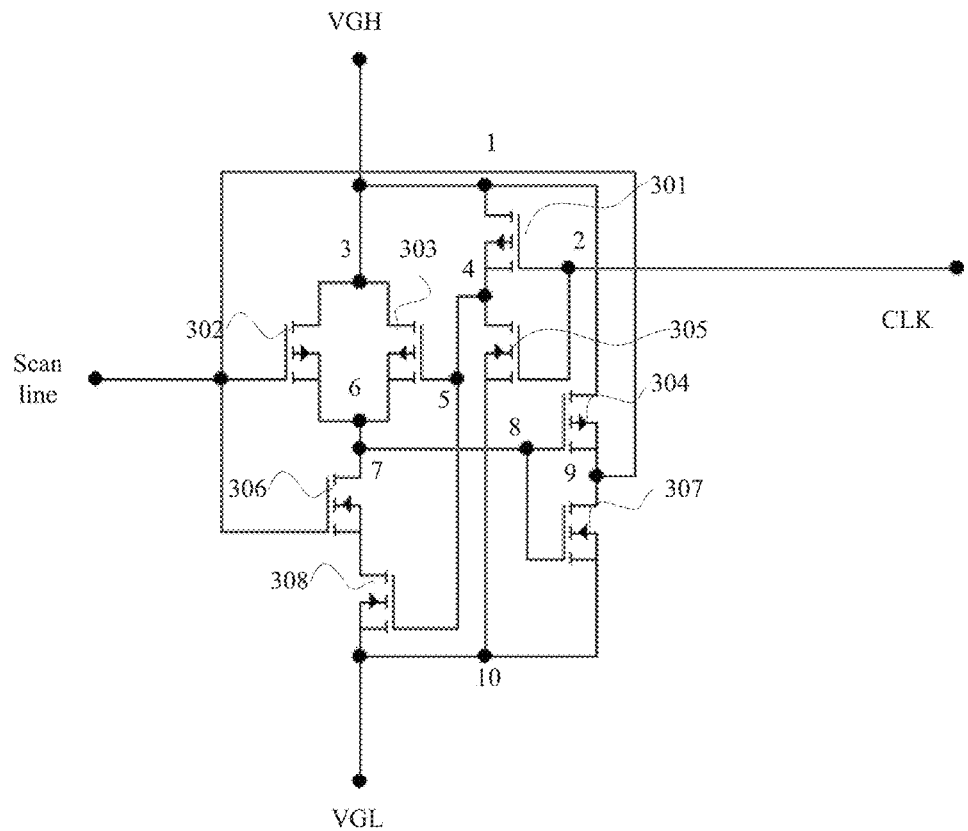
FIG. 6B is a schematic structural diagram of a second type of logic circuit according to the first embodiment of the invention.

Optionally, as illustrated in FIG. 6B, there is illustrated a structural diagram of another logic circuit according to the first embodiment of the invention, where the logic circuit is the second type of logic circuit including four P-type thin film transistors and four N-type thin film transistors, where the respective thin film transistors are connected directly or indirectly through nodes, particularly as follows:

A first P-type thin film transistor 301 having a gate connected with the control signal line through a second node, a source connected with a high-level signal line through a first node, and a drain connected with a fourth node, where the fourth node is connected with a fifth node;

A second P-type thin film transistor 302 having a gate connected with the scan line, a source connected with the high-level signal line through a third node, and a drain connected with a sixth node, where the sixth node is connected with a seventh node;

A third P-type thin film transistor 303 having a gate connected with the fifth node, a source connected with the high-level signal line through the third node, and a drain connected with the sixth node;

A fourth P-type thin film transistor 304 having a gate connected with an eighth node, a source connected with the high-level signal line through the first node, and a drain connected with the scan line through a ninth node, where the eighth node is connected with the seventh node;

A first N-type thin film transistor 305 having a gate connected with the control signal line through the second node, a drain connected with the fourth node, and a source connected with a low-level signal line through a tenth node;

A second N-type thin film transistor 306 having a gate connected with the scan line, a drain connected with the seventh node, and a source connected with a drain of a fourth N-type thin film transistor;

A third N-type thin film transistor 307 having a gate connected with the eighth node, a drain connected with the scan line through the ninth node, and a source connected with the low-level signal line through the tenth node; and The fourth N-type thin film transistor 308 having a gate connected with the fifth node, the drain connected with the source of the second N-type thin film transistor, and a source connected with the low-level signal line.

Optionally, in an embodiment of the invention, a source and a drain will not be limited particularly, and the source and the drain may be interchanged as two electrodes to some extent.

For the drive circuit described in the first embodiment above, regardless of the type of the logic circuit in the drive circuit, an appropriate input control signal can be selected according to the logic relationship in the truth table corresponding to the type of the logic circuit, and further an output control signal output to a scan line can be obtained to improve the scan signal.

Based on the drive circuit according to the first embodiment above, an embodiment of the invention provides a drive method using the drive circuit according to the first embodiment, and this solution will be described below in detail.

Figure 7:
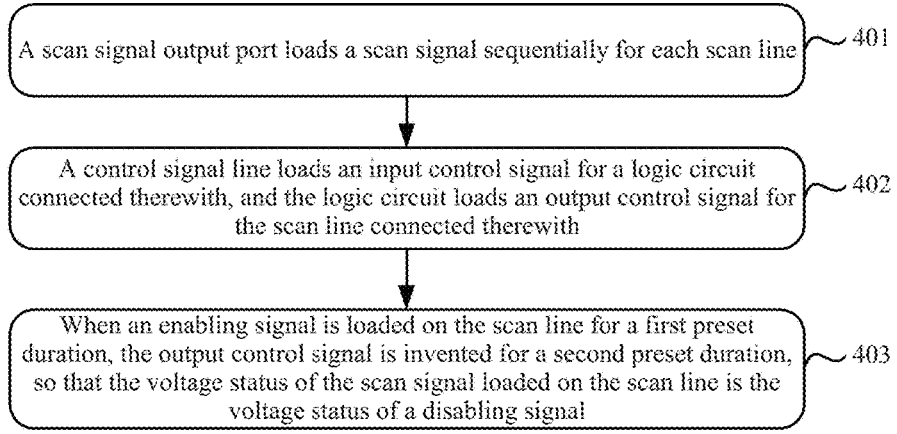
FIG. 7 is a flow chart of steps in a drive method, according to a second embodiment of the invention, using the thin film transistor drive circuit according to the first embodiment of the invention.

As illustrated in FIG. 7, there is illustrated a flow chart of steps in a drive method, according to a second embodiment of the invention, using the drive circuit according to the first embodiment of the invention, where the method includes the following steps:

Step 401: Sequentially apply a scan signal through a scan signal output port to each scan line.

Step 402: Apply an input control signal through a control signal line to a logic circuit connected therewith, and the logic circuit applies an output control signal to the scan line connected therewith.

Step 403: When an enabling signal is loaded on the scan line for a first preset duration, the output control signal is inverted for a second preset duration, so that the voltage level of the scan signal loaded on the scan line is the voltage level of a disabling signal.

Optionally, in order to make the output control signal improve the scan signal for a particular period of time, the following setting can be made:

When the scan signal is a disabling signal, that is, a TFT at this time is turned off, then the voltage level of the disabling signal will not be changed regardless of whether the output control signal loaded on the scan line is inverted, i.e., independently from a voltage state (logic state) of the output control signal, which corresponds to the logic relationships 1 and 2 in FIG. 5A and the logic relationships 1 and 2 in FIG. 5B; and When the scan signal is an enabling signal loaded for a duration which has not reached the first preset duration, that is, a TFT at this time is turned on, but there is a certain duration before the TFT is turned off, then the voltage level of the enabling signal will not be changed (i.e., remains unchanged), if the output control signal in the logic circuit corresponding to FIG. 5A is set to be non-inverted from the enabling signal, which corresponds to the logic relationship 4 in FIG. 5A, or if the output control signal in the logic circuit corresponding to FIG. 5B is set to be inverted from the enabling signal, which corresponds to the logic relationship 3 in FIG. 5B.

Optionally, when driving is performed by using the drive circuit including the logic circuit as illustrated in FIG. 6A, the following solution can be described with reference to the signal timing diagram in FIG. 8 in which a high level is an enabling voltage.

This solution will be described by taking one of scan lines as an example. As illustrated in the upper figure in FIG. 8, in the prior art, when a scan signal is loaded by a first row to the scan line, the scan signal is changed into an enabling signal (a high level) at a preset time, and the high level is held for a first preset duration t and then a specific duration $\Delta t_2$ elapses, then the high level may be changed gradually into a low level for a drop delay $\Delta t_1$ ($\Delta t_1$ may represents a rise delay in correspondence to a timing diagram taking a low level as an enabling voltage as an example), where the drop delay $\Delta t_1$ may have an influence on turning-off of a TFT and result in flickering, crosstalk and other problems of a display device.

Since an input control signal may be adjusted to obtain an output control signal to improve a scan signal on a scan line in the logic circuit as referred to in the first embodiment above, the degraded scan signal can be improved with the logic circuit illustrated in FIG. 6A in an embodiment of the invention.

Specifically, when a scan signal is loaded by the first row to the scan line, the scan signal is changed into an enabling signal (a high level) at a preset time. The scan signal is held in the voltage level of a disabling signal (a low level) prior to the preset time, and at this time, the first P-type thin film transistor 201 and the first N-type thin film transistor 204 are turned on respectively, and the third P-type thin film transistor 203 and the second N-type thin film transistor 205 are turned off, and the voltage level of the disabling signal will not be changed regardless of whether the output control signal loaded on the scan line is inverted from the disabling signal, that is, the voltage level of the disabling signal will not be changed (i.e., remains unchanged) regardless of whether the input control signal is inverted from the disabling signal (i.e., independently from the voltage state of the input control signal). The input control signal is at a high level for this period of time in the timing diagram. When the high level on the scan line is held for a first preset duration t, the input control signal is changed from the high level to a low level, and the low level is held until the time when the input control signal is changed into a high level, that is, the low level is held for a second preset duration $\Delta t$, where $\Delta t$ is the sum of the specific duration $\Delta t_2$ and the drop delay $\Delta t_1$.

Figure 8:
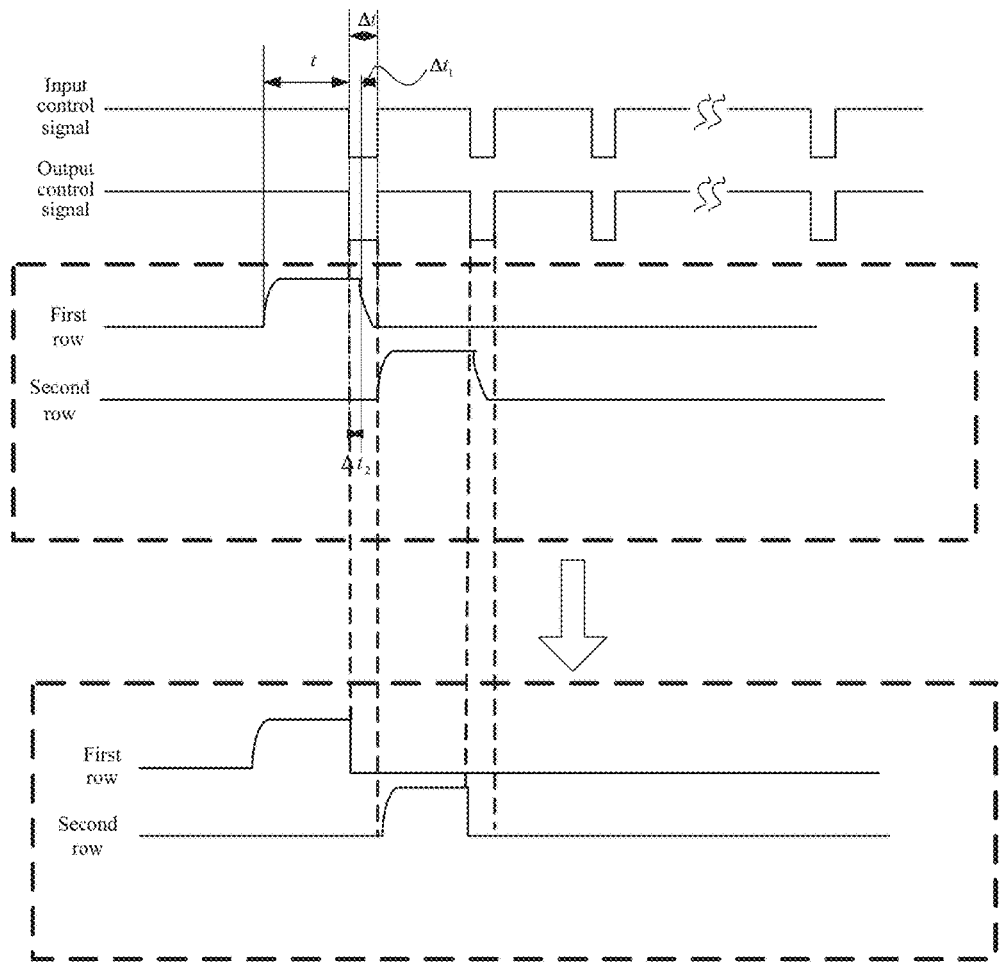
FIG. 8 is a comparison diagram of signal timings before and after driving by using the thin film transistor drive circuit including the first type of logic circuit.

When the input control signal loaded on the logic circuit is inverted from the enabling signal, the second P-type thin film transistor 202, the first N-type thin film transistor 204 and the second N-type thin film transistor 205 are turned on respectively, and the first P-type thin film transistor 201, the third P-type thin film transistor 203 and the third N-type thin film transistor 206 are turned off, so the voltage status of the scan signal loaded on the scan line can be the voltage status of the disabling signal if the output control signal loaded on the scan line is inverted from the enabling signal, to obtain the signal illustrated in the lower figure in FIG. 8. When the input control signal loaded on the logic circuit is non-inverted from the enabling signal, the third P-type thin film transistor 203, the second N-type thin film transistor 205 and the third N-type thin film transistor 206 are turned on, and the first P-type thin film transistor 201, the second P-type thin film transistor 202 and the first N-type thin film transistor 204 are turned off, and the output control signal loaded on the scan line is non-inverted from the enabling signal, so that the voltage status of the scan signal loaded on the scan line is still the voltage status of the enabling signal. Thus for the second preset duration, the input control signal is changed into a low level, and the output control signal is also a low level by using the logic circuit and output to the scan line, so that the high level on the scan line is changed into a low level, to improve the degraded signal at the time of being turned off.

It shall be noted that the input control signal is inverted before the drop delay begins in the second preset duration, because the delay distortion of the scan signal at the drop delay can be improved as much as possible.

Optionally, as can be apparent from the foregoing disclosure, the first preset duration t is determined by the expression (1):

$$t=T-(\Delta t-\Delta t_1) \qquad (1)$$

Where t is the first preset duration; T is a duration for which the enabling signal is loaded ideally; $\Delta t$ is the second preset duration; and $\Delta t_1$ is the rise delay of a voltage or the drop delay of a voltage. Optionally, the enabling signal on the scan line is held for the second preset duration which may be in the range between 100 ns and 900 ns.

In addition to the drive circuit including the logic circuit illustrated in FIG. 6A which can be used to drive to achieve the foregoing effect, the logic circuit illustrated in FIG. 6B can be used for driving to improve the problem of the degraded delayed signal. A simply analysis will be made for the logic circuit illustrated in FIG. 6B under a principle similar to the logic circuit illustrated in FIG. 6A described above except a particular function is embodied differently from the logic circuit illustrated in FIG. 6A in the second preset duration.

Optionally, with the logic circuit illustrated in FIG. 6B for driving, in the second preset duration:

When the scan signal is a disabling signal, the second P-type thin film transistor 302 and the third N-type thin film transistor 307 are turned on respectively, and the fourth P-type thin film transistor 304 and the second N-type thin film transistor 306 are turned off, and the voltage status of the disabling signal will not be changed regardless of whether the output control signal loaded on the scan line is inverted from the disabling signal, that is, the voltage status of the disabling signal will not be changed regardless of whether the input control signal is inverted from the disabling signal; and When the scan signal is an enabling signal, if the input control signal loaded on the logic circuit is inverted from the enabling signal, the first P-type thin film transistor 301, the fourth P-type thin film transistor 304, the second N-type thin film transistor 306 and the fourth N-type thin film transistor 308 are turned on respectively, and the second P-type thin film transistor 302, the third P-type thin film transistor 303, the first N-type thin film transistor 305 and the third N-type thin film transistor 307 are turned off, and then the output control signal loaded on the scan line is non-inverted from the enabling signal, so that the voltage status of the scan signal loaded on the scan line is still the voltage status of the enabling signal; and if the input control signal loaded on the logic circuit is non-inverted from the enabling signal, the third P-type thin film transistor 303, the first N-type thin film transistor 305, the second N-type thin film transistor 306 and the third N-type thin film transistor 307 are turned on respectively, and the first P-type thin film transistor 301, the second P-type thin film transistor 302, the fourth P-type thin film transistor 304 and the fourth N-type thin film transistor 308 are turned off, and then the output control signal loaded on the scan line is inverted from the enabling signal, so that the voltage status of the scan signal loaded on the scan line is the voltage status of the disabling signal.

Moreover, an embodiment of the invention further provides a liquid crystal display device including any of the drive circuits in the respective embodiments above.

Although the preferred embodiments of the invention have been described, those skilled in the art benefiting from the underlying inventive concept can make additional modifications and variations to these embodiments. Therefore, the appended claims are intended to be construed as encompassing the preferred embodiments and all the modifications and variations coming into the scope of the invention.

Evidently, those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A thin film transistor drive circuit, comprising:
a plurality of scan lines;
a scan signal output port configured to sequentially apply a scan signal to each of the plurality of scan lines; and
a plurality of logic circuits, wherein each of the plurality of logic circuits is connected with one of the plurality of scan lines and a control signal line, for receiving an input control signal from the control signal line and applying an output control signal to the plurality of scan lines;
wherein, when an enabling signal is loaded on one of the plurality of scan lines for a first preset duration, inverting the output control signal for a second preset duration, so that a voltage level of the scan signal loaded on the scan lines is a voltage level of a disabling signal;
wherein a voltage level of the enabling signal on the plurality of scan lines is dropped to a lower level after the second present duration begins;
wherein in the second preset duration:
when the scan signal is a disabling signal, the voltage level of the disabling signal remains unchanged independently from a voltage state of the output control signal; and
when the scan signal is the enabling signal, if the input control signal loaded on the logic circuit is inverted from the enabling signal, then the output control signal loaded on the scan line is inverted from the enabling signal, so that the voltage level of the scan signal loaded on the plurality of scan lines is the voltage level of the disabling signal; and if the input control signal loaded on the logic circuit is non-inverted from the enabling signal, then the output control signal loaded on the plurality of scan lines is non-inverted from the enabling signal, so that the voltage level of the scan signal loaded on the plurality of scan lines is still the same voltage level of the enabling signal.

2. The drive circuit according to claim 1, wherein one of the logic circuits is connected with an end of one of the plurality of scan lines.

3. The drive circuit according to claim 1, wherein one of the logic circuits comprises:
a first P-type thin film transistor having a gate connected with the scan line, a source connected with a first node, and a drain connected with a second node, wherein the first node is connected with a high-voltage level signal line and the second node is connected with a third node;
a second P-type thin film transistor having a gate connected with the control signal line through a fourth node, a source connected with the first node, and a drain connected with the second node;
a third P-type thin film transistor having a gate connected with a fifth node, a source connected with the high-voltage level signal line, and a drain connected with a sixth node, wherein the sixth node is connected with the scan line;
a first N-type thin film transistor having a gate connected with the fifth node, a drain connected with the sixth node, and a source connected with a low-voltage level signal line;
a second N-type thin film transistor having a gate connected with the scan line, a drain connected with the third node, and a source connected with a drain of a third N-type thin film transistor; and
the third N-type thin film transistor having a gate connected with the control signal line through the fourth node, a drain connected with the source of the second N-type thin film transistor, and a source connected with the low-voltage level signal line.

4. The drive circuit according to claim 1, wherein one of the plurality of logic circuits comprises:
a first P-type thin film transistor having a gate connected with the control signal line through a second node, a source connected with a high-voltage level signal line through a first node, and a drain connected with a fourth node, wherein the fourth node is connected with a fifth node;
a second P-type thin film transistor having a gate connected with one of the plurality of scan lines, a source connected with the high-voltage level signal line through a third node, and a drain connected with a sixth node, wherein the sixth node is connected with a seventh node;
a third P-type thin film transistor having a gate connected with the fifth node, a source connected with the high-voltage level signal line through the third node, and a drain connected with the sixth node;
a fourth P-type thin film transistor having a gate connected with an eighth node, a source connected with the high-voltage level signal line through the first node, and a drain connected with the scan line through a ninth node, wherein the eighth node is connected with the seventh node;
a first N-type thin film transistor having a gate connected with the control signal line through the second node, a drain connected with the fourth node, and a source connected with a low-voltage level signal line through a tenth node;
a second N-type thin film transistor having a gate connected with the scan line, a drain connected with the seventh node, and a source connected with a drain of a fourth N-type thin film transistor;
a third N-type thin film transistor having a gate connected with the eighth node, a drain connected with the scan line through the ninth node, and a source connected with the low-voltage level signal line through the tenth node; and
the fourth N-type thin film transistor having a gate connected with the fifth node, a drain connected with the source of the second N-type thin film transistor, and a source connected with the low-voltage level signal line.

5. A method for driving a display panel having a plurality of scan lines, the method comprising:
sequentially applying a scan signal to each of the plurality scan lines; and
applying an input control signal to a logic circuit; and applying an output control signal by the logic circuit to the plurality of scan line;

wherein, when an enabling signal is loaded on the scan line for a first preset duration, inverting the output control signal for a second preset duration, so that a voltage level of the scan signal loaded on the plurality of scan lines is the voltage level of a disabling signal;

wherein the high voltage level of the enabling signal on the plurality of scan line is dropped to a lower voltage level after the second preset duration begins;

wherein in the second preset duration:

when the scan signal is a disabling signal, the voltage level of the disabling signal remains unchanged independently from a voltage state of the output control signal; and when the scan signal is the enabling signal, if the input control signal loaded on the logic circuit is inverted from the enabling signal, then the output control signal loaded on the scan line is inverted from the enabling signal, so that the voltage level of the scan signal loaded on the plurality of scan lines is the voltage level of the disabling signal; and if the input control signal loaded on the logic circuit is non-inverted from the enabling signal, then the output control signal loaded on the plurality of scan lines is non-inverted from the enabling signal, so that the voltage level of the scan signal loaded on the plurality of scan lines is still the same voltage level of the enabling signal.

6. The drive method according to claim 5, wherein:

if the scan signal is the disabling signal, then the voltage level of the disabling signal remains unchanged independently from a voltage level of the output control signal; and if the scan signal is the enabling signal loaded for a duration which has not reached the first preset duration, then the voltage level of the enabling signal cannot be changed by the output control signal.

7. The drive method according to claim 5, wherein the second preset duration is in a range between 100 ns and 900 ns.

8. The drive method according to claim 7, wherein the first preset duration is determined by the expression:

$$t=T-(\Delta t-\Delta t_1),$$

Wherein t is the first preset duration; T is a duration for which the enabling signal is loaded ideally; $\Delta t$ is the second preset duration; and $\Delta t_1$ is the rise delay of a voltage or the drop delay of a voltage.

9. A liquid crystal display device comprising a thin film transistor drive circuit, wherein the thin film transistor drive circuit comprises:

a plurality of scan lines;

a scan signal output port configured to sequentially apply a scan signal to each of the plurality of scan lines; and a plurality of logic circuits, wherein each of the plurality of logic circuits is connected with one of the plurality of scan lines and a control signal line, for receiving an input control signal from the control signal line and applying an output control signal to the plurality of scan line; wherein, when an enabling signal is loaded on one of the plurality of scan lines for a first preset duration, inverting the output control signal for a second preset duration, so that a voltage level of the scan signal loaded on the scan line is the voltage level of a disabling signal;

wherein the high voltage level of the enabling signal on the scan line dropped to a low voltage level after the second preset duration begins;

wherein in the second preset duration:

when the scan signal is a disabling signal, the voltage level of the disabling signal remains unchanged independently from a voltage state of the output control signal; and when the scan signal is the enabling signal, if the input control signal loaded on the logic circuit is inverted from the enabling signal, then the output control signal loaded on the scan line is inverted from the enabling signal, so that the voltage level of the scan signal loaded on the plurality of scan lines is the voltage level of the disabling signal; and if the input control signal loaded on the logic circuit is non-inverted from the enabling signal, then the output control signal loaded on the plurality of scan lines is non-inverted from the enabling signal, so that the voltage level of the scan signal loaded on the plurality of scan lines is still the same voltage level of the enabling signal.

10. The liquid crystal display device according to claim 9, wherein one of the plurality of logic circuits is connected with an end of one of the plurality of scan lines.

11. The liquid crystal display device according to claim 9, wherein one of the plurality of the logic circuits comprises:

a first P-type thin film transistor having a gate connected with one of the plurality of the scan line, a source connected with a first node, and a drain connected with a second node, wherein the first node is connected with a high-voltage level signal line and the second node is connected with a third node;

a second P-type thin film transistor having a gate connected with the control signal line through a fourth node, a source connected with the first node, and a drain connected with the second node;

a third P-type thin film transistor having a gate connected with a fifth node, a source connected with the high-voltage level signal line, and a drain connected with a sixth node, wherein the sixth node is connected with the scan line;

a first N-type thin film transistor having a gate connected with the fifth node, a drain connected with the sixth node, and a source connected with a low-voltage level signal line;

a second N-type thin film transistor having a gate connected with the scan line, a drain connected with the third node, and a source connected with a drain of a third N-type thin film transistor; and the third N-type thin film transistor having a gate connected with the control signal line through the fourth node, a drain connected with the source of the second N-type thin film transistor, and a source connected with the low-voltage level signal line.

12. The liquid crystal display device according to claim 9, wherein one of the logic circuits comprises:

a first P-type thin film transistor having a gate connected with the control signal line through a second node, a source connected with a high-voltage level signal line through a first node, and a drain connected with a fourth node, wherein the fourth node is connected with a fifth node;

a second P-type thin film transistor having a gate connected with the plurality of scan lines, a source connected with the high-voltage level signal line through a third node, and a drain connected with a sixth node, wherein the sixth node is connected with a seventh node;

a third P-type thin film transistor having a gate connected with the fifth node, a source connected with the high-voltage level signal line through the third node, and a drain connected with the sixth node;

a fourth P-type thin film transistor having a gate connected with an eighth node, a source connected with the high-voltage level signal line through the first node, and a drain connected with one of the plurality of scan line through a ninth node, wherein the eighth node is connected with the seventh node;

a first N-type thin film transistor having a gate connected with the control signal line through the second node, a drain connected with the fourth node, and a source connected with a low-voltage level signal line through a tenth node;

a second N-type thin film transistor having a gate connected with one of the plurality of the scan lines, a drain connected with the seventh node, and a source connected with a drain of a fourth N-type thin film transistor;

a third N-type thin film transistor having a gate connected with the eighth node, a drain connected with one of the plurality of scan lines through the ninth node, and a source connected with the low-voltage level signal lines through the tenth node; and the fourth N-type thin film transistor having a gate connected with the fifth node, a drain connected with the source of the second N-type thin film transistor, and a source connected with the low-voltage level signal line.

* * * * *